United States Patent [19]

Kyotani et al.

[11] 3,846,802

[45] Nov. 5, 1974

[54] SELF RENEWING STYLUS STRUCTURE

[75] Inventors: Hirosi Kyotani, Osaka; Yositaka Murono, Tenri; Katuhiko Siojima, Nara-Ken, all of Japan

[73] Assignee: Sharp Kabushiki Kaisha, Osaka, Japan

[22] Filed: May 18, 1973

[21] Appl. No.: 361,582

[30] Foreign Application Priority Data

| | | |
|---|---|---|
| May 19, 1972 | Japan | 47-51382 |
| Feb. 8, 1973 | Japan | 48-15901 |
| Feb. 14, 1973 | Japan | 48-18132 |
| Feb. 16, 1973 | Japan | 48-19530 |

[52] U.S. Cl. .......... 346/74 E, 346/139 C

[51] Int. Cl. .......... G01d 15/06, G01d 15/20

[58] Field of Search .......... 346/139 A, 139 C, 74 E, 346/74 ES, 74 CH

[56] References Cited

UNITED STATES PATENTS

| | | | |
|---|---|---|---|
| 2,850,350 | 9/1958 | Wise | 346/139 C |
| 3,328,804 | 6/1967 | Morse | 346/139 C |
| 3,541,579 | 11/1970 | Hippel | 346/139 C |

*Primary Examiner*—Bernard Konick
*Assistant Examiner*—Jay P. Lucas
*Attorney, Agent, or Firm*—Stewart and Kolasch, Ltd.

[57] ABSTRACT

The present disclosure is directed to a facsimile device equipped with a disc type recorder containing a reel in which a recording stylus is accommodated. Revolution torque is afforded to the reel, by rotating the disc within the recorder and the stylus is appropriately protruded toward a recording paper as a result of the torque acting upon the reel. With such adjustment mechanism the contact of the stylus with the recording paper will be maintained at a substantially uniform and optimum pressure appropriate to the recording paper being used irrespective of shortening of the stylus due to wear.

12 Claims, 8 Drawing Figures

SELF RENEWING STYLUS STRUCTURE

BACKGROUND OF THE INVENTION

This invention relates to a recording stylus structure for use in a facsimile recorder, and more particularly to an improved recording stylus structure capable of automatically maintaining an optimum writing pressure irrespective of the extent of the stylus wear.

In a conventional facsimile device equipped with a disc type recorder, information signals are successively recorded on electrodischarge recording papers or other electrosensitive recording papers in accordance with signals written by synchronous revolution of the disc and scan of an electrode stylus. However, especially in the case where recording operation continues over a long period of time, the stylus wear imposes a serious problem on the recording operation. The electrode stylus is worn away by dissolution wear due to discharging heat which occurs during the recording process and mechanical wear due to sweep on the recording paper so that the stylus pressure against the recording paper is reduced. For these reasons the light and shade of the facsimile copy is gradually reduced and thus it is difficult to obtain uniform facsimile copies. Eventually the electrode stylus does not contact the surface of the recording paper at all so that the recording process must be interrupted periodically for service in order to maintain an optimum writing pressure at all times.

Although the stylus is made of a very resistant material such as tungsten wire in order to minimize the wear of the electrode stylus, the stylus wear is by no means avoidable for successive and long recording operations. For the facsimile recorder subject to stylus wear it becomes necessary to periodically replace the stylus or adjust the stylus pressure.

For instance, the prior art arrangement embodying the latter method, as disclosed in U.S. Pat. No. 2,850,350 granted to Releigh J. Wise et al., utilizes a comparatively short electrode stylus disposed in a radial direction of the disc carrying the electrode stylus. The electrode stylus is supported by the force of an elastic material such as a spring, so as not to move unnecessarily during the recording process. The adjustment as to the degree of protrusion of the electrode stylus due to its wear is provided for in such a way that the rear end of the electrode stylus is pushed and protruded forward by the attraction of an electromagnet and the tension of a spring, etc. until it strikes a precisely arranged anvil.

As discussed above, in the facsimile recorder provided with the stylus advancement mechanism, the initial length of the electrode stylus is considerably short in view of structual limitations and the total stylus protrusion is only several millimeters to tons of several millimeters even if stylus advancement is automatically effected. Consequently, the recorder is operable only for a comparatively short time period, for example, 40 to 100 hours. Replacement of the stylus is required.

OBJECTS AND SUMMARY OF THE INVENTION

Accordingly, the primary object of this invention is to provide a recording stylus structure which avoids one or more of the disadvantages and limitations of the prior art arrangements by producing a force of an electrode stylus exerted on a recording paper with the revolution of a disc during the recording process.

Another object of this invention is to provide a recording stylus structure which does not need periodic replacement of the electrode stylus even for long and successive recording operation by providing a reel which is capable of accommodating a considerably long electrode stylus in a spiral form therein.

A further object of this invention is to provide a recording stylus structure wherein the stylus protrusion force is originated from brake means providing a damping torque associated with the revolution of the disc and the damping torque is then controlled to adjust strength of the stylus protrusion force.

Still another object of this invention is to provide a recording stylus structure wherein the stylus protrusion force disappears upon stopping revolution of the disc thereby facilitating replacement of the recording paper and maintenance of the recorder system.

A further object of this invention is to provide a recording stylus structure wherein a groove is provided at the rear of the stylus carrying reel for absorbing deflection of the electrode stylus to balance the stylus advancement force with a reaction force from the recording paper thereby enabling the recording operation with a predetermined fixed writing pressure.

It is still a further object of this invention is to provide a recorder mechanism which is provided at a position where the electrode stylus contacts the surface of the recording paper with a guide plate pressing down the recording paper thereby enabling stable writing operations.

Another object of this invention is to provide a recording mechanism wherein a recording paper detection plate is disposed in the paper travelling course and thus application of information signals to the electrode stylus or supply of the paper can be stopped in the case where the recording paper or original is not inserted at a correct position between the disc and the paper guide.

To be brief, in accordance with this invention, in a disc type facsimile recorder wherein a disc is rotated to scan the surface of a recording paper, a reel is provided for accommodating an electrode stylus of a sufficient length. The electrode stylus can be automatically protruded and correctly engaged against the recording paper as the disc continues revolving no replacement of the electrode stylus is required even for long time operations.

In addition, the stylus pressure exerted on the recording paper can be maintained at a substantially uniform and optimum value irrespective of shortening of the stylus due to wear thereof.

DESCRIPTION OF THE PREFERRED EMBODYMENTS

Figure 1:
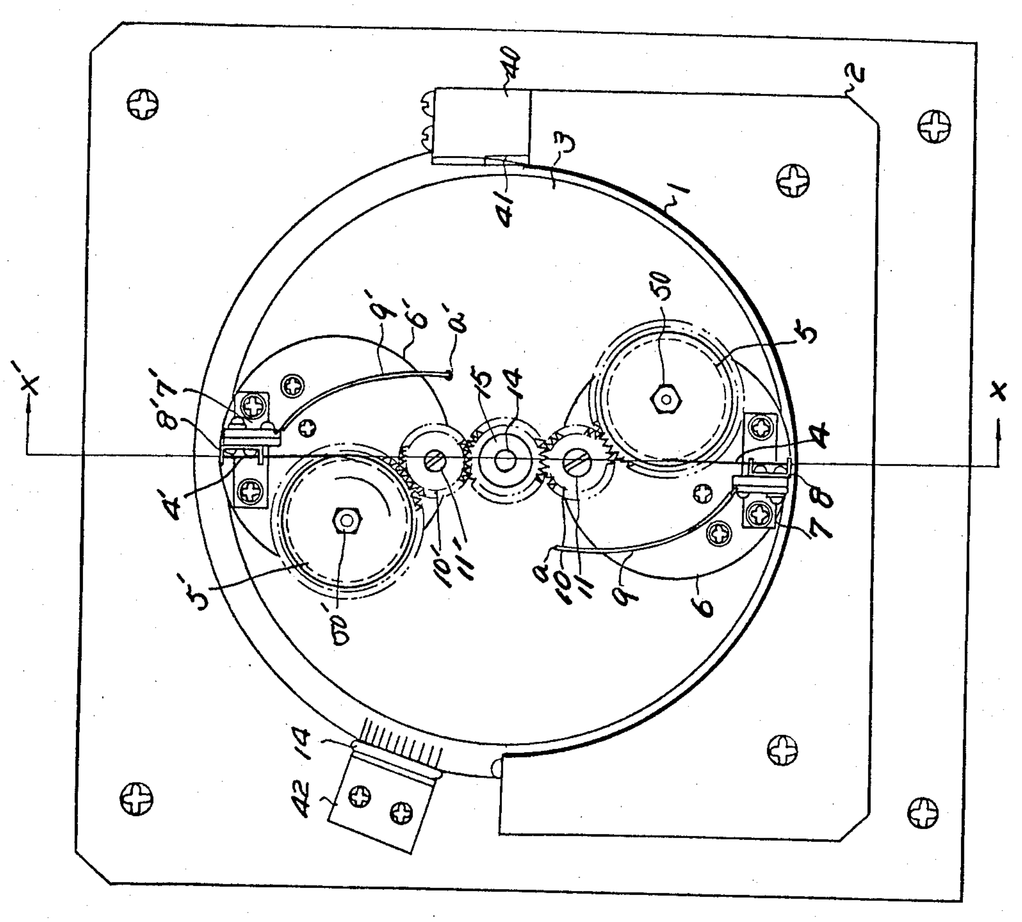
FIG. 1 is a front view of a recorder mechanism of a facsimile embodying this invention.
Figure 2:
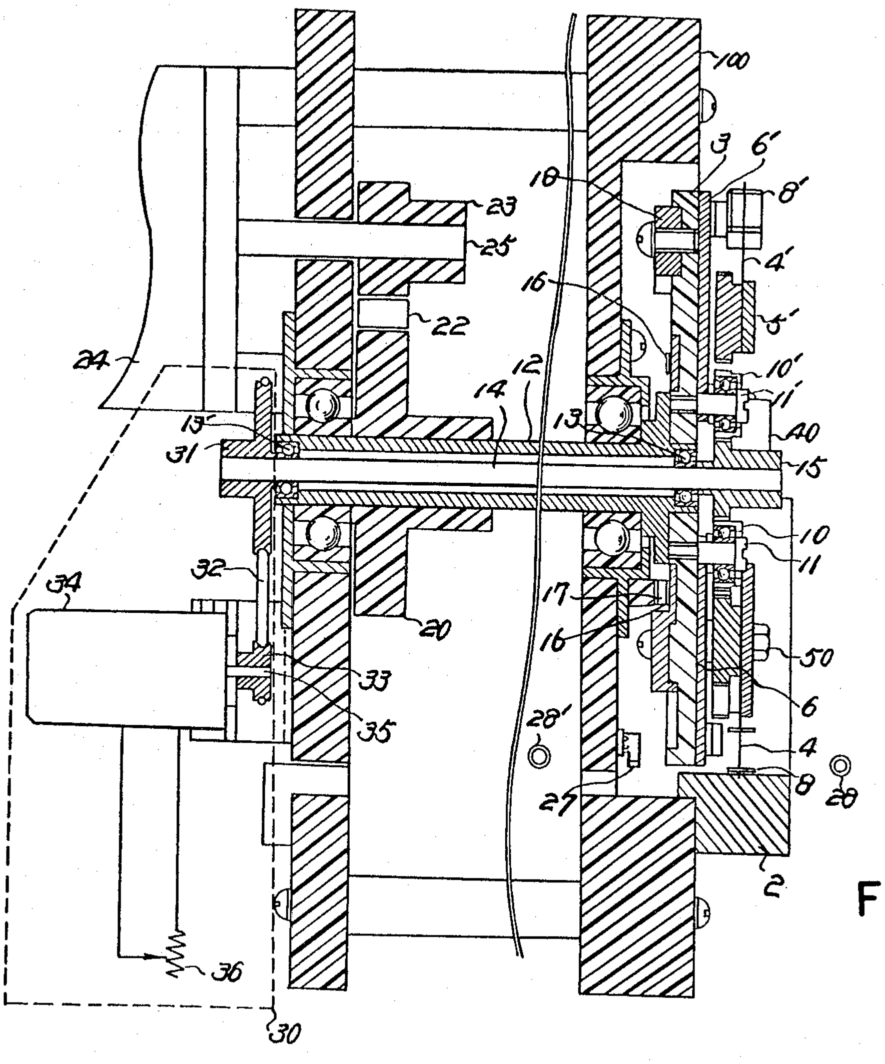
FIG. 2 is a fragmentary view taken on the view line X—X' of FIG. 1 looking in the direction of the arrows.

Referring now to FIG. 1, the reference nunber 1 designates an electrosensive recording paper such as an electrodischarge type paper which is curved in a transverse direction thereof and supplied from a roll (not illustrated) during the recording operation. The recording paper travels along a recording paper guide 2 having a semicircular surface.

The reference number 3 designates a rotary disc having a circumference corresponding to an integral multiple, for example, of about twice, the width of the recording paper 1. A pair of reels 5, 5′ which accommodate electrode styluses 4, 4′ such as tungsten wires serving as recording styluses in a spiral fashion therein, are rotatably installed at places symmetric by 180° with respect to the center of the disc 3 on axes 50, 50′. In this way the reels 5, 5′ are installed at one side of the rotary disc 3 through reel installation plates 6, 6′ affixed to the disc 3. Therefore, in the case where the disc 3 rotates in synchronization with control signals transmitted from facsimile signal processing apparatus, the surface of the recording paper 1 is scanned by a pair of the electrode styluses 4, 4′ to successively perform recording operations. Since the symetrically disposed reels 5, 5′ have the identical construction, only an electrode stylus associated with the reel 5 will be explained for the sake of convenience.

Figure 3A:
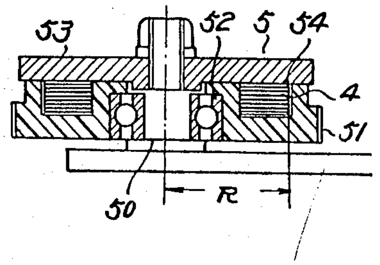
FIGS. 3(*a*), 3(*b*) and 3(*c*) are respectively a fragmentary view of a stylus-accommodating reel, a rear view of a reel cover, and a plan view of the reel without the cover.
Figure 3B:
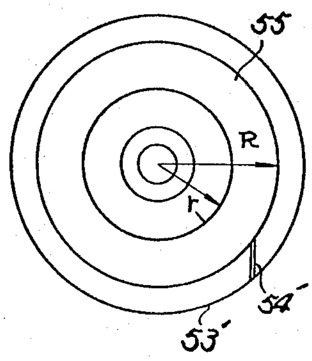
Figure 3C:
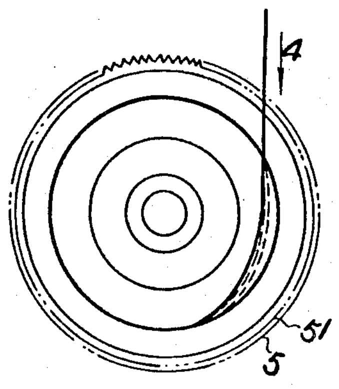

In FIG. 3, the electrode stylus 4 made of an elastic and anti-abrasive material such as tungsten wire is received within the interior of the reel 5. The electrode stylus 4, as shown in this drawing, is accommodated about the periphery wall not about the central wall within the reel 5 by means of an unwinding force occuring due to the elastic property thereof. One end of the electrode stylus 4 is projected as the recording stylus through a guide aperture 54 of a reel cover 53 to be engaged with the recording paper.

More particularly, as shown in FIG. 3(*a*), the guide aperture 54 is formed in a direction of the tangent touching the stylus winding circumference of the reel 5. Furthermore, as shown in FIG. 3(*b*), the guide aperture 54′ may be shifted from the stylus winding circumference to the center thereof. A cavity having at least the stylus winding radius R, or a concentric groove 55 having a width of R through *r* wherein *r* is the small radius of the reel cavity, is provided to establish a room for absorbing deflection of the stylus caused during the writing procedure. Wheel teeth 51 are provided at the side wall of the reel 5 to mesh with an idle wheel to be explained later thereby rotating on a shaft 50 through a journal 52. The cover 53 is discrete from the reel and thus does not rotate when the reel 5 is turning round on its axis. Therefore, the electrode stylus 4 is held at the precise position.

The electrode stylus 4 derived from the reel 5 is supported by a wire guide 8 affixed to a wire guide installation plate 7 which in turn is secured to the reel installation plate 6. The end of the stylus 4 is protruded from the circular surface of the disc 3 to interface with the recording paper 1 traveling along the semicircular surface of the paper guide 2. The wire guide 8 of an electric conductor is coupled with a lead wire 9 to supply the electrode stylus 4 with the recording signals transmitted from the facsimile signal processing apparatus thereby to produce a facsimile image on the recording paper 1.

The other end of the lead wire 9 after passing through a small hole a of the disc 3 is connected with a conductive slipring 16 which is concentrically affixed to the rear of the rotary disc and always contacts a brush 17 at any position thereof at least during the recording procedure. The brush receives the signals to be recorded from the facsimile signal processing apparatus and accordingly the information signals to be recorded are supplied to the electrode stylus 4 via the slip ring 16, lead wire 9 and wire guide 8. The reference number 18 designates a balancing weight for the rotary disc 3.

The following description is directed to a structure which imports to the above electrode stylus 4 a protrusion force exerted on the recording paper 1.

The idle gear 10 engages with the teeth 51 of the reel 5 and is installed on the reel installation plate 6 by a shaft 11. Elements and components affixed to the disc 3 such as the idle gear 10, the reel 5 and so forth revolve around the center of the disc 3 when the disc 3 is turning on its own axis. The revolution of the disc 3 is caused through a main shaft 12 to which a main shaft pulley 20 is secured. The revolution of the speed is reduced to a predetermined rate through a belt 22 extending between the main shaft pulley 20 and a driving pulley 23 secured to a rotating shaft 25 of a driving motor 24.

The main shaft 12 is tubular and a protrusion shaft 14 of which both ends are supported by journals 13, 13′ is accommodated within the tubular shaft 12. One end of the protrusion shaft 14 extends to the center of the disc 3 and carries a main gear 15, which meshes with the idle gear 10 to afford the revolution torque to the reel 5 through the idle gear 10. In the same manner the revolution torque is transmitted from the main gear 15 to the other reel 5′ via the gear 10′.

Although the idle gear 10 is secured to the disc 3 via a proper journal by a shaft 11 to move around the center of the disc 3 during the revolution of the disc 3, the main gear 15 is not directly coupled with the disc 3 and thus moves separatively irrespective of the disc 3. This results in that the revolution torque from the idle gear 10 is transmitted to the protrusion shaft 14.

Provision of braking means 30 at the other end of the protrusion axis 14 applies the revolution torque to the reels 5, 5′. Taking an example of the braking means 30, a first V shaped pulley 31 is attached to the protrusion shaft 14 and the revolution force from the protrusion shaft 14 is fed to a second V shaped pulley 33 attached via a circular belt 32 to a rotating shaft 35 of a braking motor 34. The braking motor 34 is a DC motor operative as an electric generator activated by the revolution force transmitted from the protrusion shaft 14 and a variable shunt resistor 36 is connected between both terminals of the braking motor 34.

Returning now to FIG. 1, admission means 40 is provided at the place where the electrode styluses 4, 4′ are advanced to interface with the recording paper 1 during the revolution of the disc 3. The object of provision the admission means 40 is that the electrode styluses 4, 4′ do not catch the edge of the recording paper 1 when the styluses 4, 4′ are advanced to the writing positions. A pressure plate 41 within the admission means 40 is made up of superhardness materials such as ceramic or antiabrasive metalic materials electrically isolated from the recording paper guide 2 and so forth. The pressure plate 41 is disposed at an angle with the circular surface of the disc 3. The electrode styluses 4, 4' gradually contact the pressure plate 41 as the disc 3 rotates and advances to the writing point on the recording paper 1 by means of the pressure plate 41 which functions as a step. In order to minimize shocks given to the electrode styluses 4, 4' in operation the end portion of the pressure plate 41 is made thin to reduce height difference between the surfaces of the pressure plate 41 and the paper 1 viewing from the electrode styluses 4, 4'.

Figure 4:
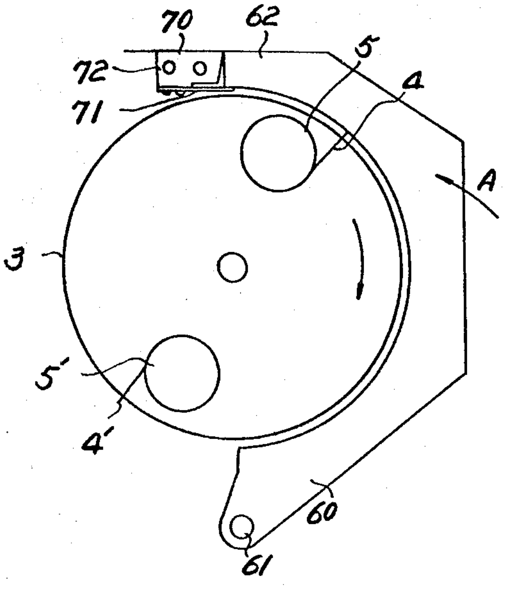
FIG. 4 is a front view of a modification of a recording paper guide.
Figure 5:
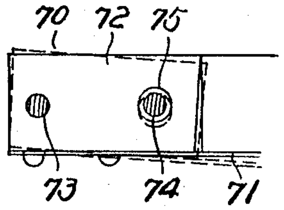
FIG. 5 is an enlarged view for the purpose of explanation of the operation of the guide shown in FIG. 4.

Modifications of the recording paper guide and the admission means are illustrated in FIGS. 4 and 5. In the illustrated example of FIG. 4, the recording paper guide 60 may be manually rotated about a supporting point of the end 61 thereof in a direction shown by an arrow A to facilitate insertion and removal of the recording paper 1. The admission arrangement 70 is previously positioned at a place where the other end 62 is properly positioned under circumstances where the recording guide 60 is set at a predetermined position with respect to the disc 3. The admission arrangement 70 comprises an electrode stylus advancing pressure plate 71 and an installation plate 72. The installation plate 72 is secured on the body frame by means of first and second shafts 73, 74. The installation plate 72 can rotate round the first shaft 73 with no permitted play. However, since an aperture 75 of the installation plate 72 through which the second shaft 72 extends is larger than the shaft radius, the installation plate 72 can rotate freely taking the first shaft 73 as the central point of the revolution within a range where the second shaft 74 can move in the aperture 75, as shown by dotted lines in FIG. 5. That is to say, the installation plate 72 is moved to the dotted position by rotation about the first shaft 73 as the central point thereof under the circumstances when the recording paper guide 60 is not set to interface with the disc 3. In these circumstances, when the recording paper guide 60 is moved to interface with the semicircular surface of the disc, the end of the recording paper guide 60 reaches and touches the inclined side wall of the installation plate 72. When the paper guide 60 is further moved, its end slides along the side wall of the installation plate 72 and thus the installation plate 72 is set and maintained to the predetermined position as shown by solid lines. At the same time the pressure plate 71 also is rotated in unison with the installation plate 72 to press down the end of the recording paper 1 loaded along the guide 60 thereby leading the electrode styluses onto the recording paper. With this arrangement there is no possibility that the electrode styluses catch the end of the recording paper 1 during the recording operation. In this way the styluses may be smoothly advanced to the precise writing point.

In FIG. 1, the reference number 42 represents a cleaner brush disposed adjacent the surface of the disc 3 and spaced from recording paper guide 2 to remove the dust adhered to the electrode styluses 4, 4' and the wire guide 8.

A metal plate 27 installed in an electric isolation relationship on a frame 100 which carries rotatably the disc 3, etc., is provided for detecting presence and absence of the recording paper 1. In the case of the electrodischarge recording type the metal plate 27 electrically contacts the conductive material painted on one surface of the recording paper 1 and forms an electric circuit associated with a return electrode 28 also serving as a paper feeding roller.

Figure 6:
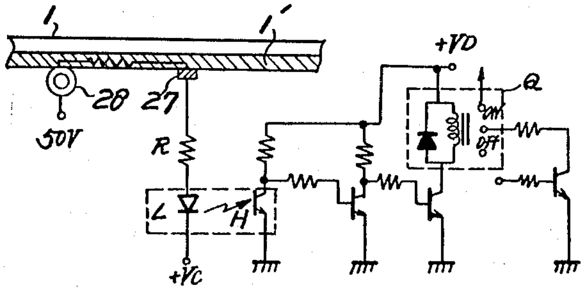
FIG. 6 is a circuit diagram illustrating a recording paper detection arrangement.

FIG. 6 discloses a switching circuit controlling application of the information signals to the electrode styluses 4, 4' installed on the rotary disc 3 by responding to recording paper detection signals derived via the conductive layer 1' of the paper 1 from the above electric circuit including the metal plate 27 and return electrode 28. For example, a light emitting element L is connected with the metal plate 27 via a resistor R while a light sensitive element H is so placed as to sense the light from the light emitting element L and connect via an amplifier with a relay Q. The relay Q controls on and off modes of the circuit providing the electrode styluses 4, 4' with the information signals, revolution of the disc 3, and power for a motor driving a paper feeding roller and so forth.

The other end of the light emitting element L may be connected to the ground potential but, in the case where the voltage applied between the metal plate 6 and the recording paper 1 is high enough to cause electric spark therebetween, the certain potential Vc being higher than the ground potential and sufficient to turn the light emitting element L on, is supplied to the other end of the element L.

Under the recording conditions that the recording paper 1 is set and supported at the precise position by the disc 3 and the recording paper guide 2 to enable the electrodischarge recording operation, a fixed voltage is applied to the return electrode 28 so that the metal plate 27 is electrically connected via the conductive layer of the paper 1 to detect the presence of the recording paper 1 and activate the switching circuit. In other words, driving current flows through the light emitting element L via the metal plate 27 and the resistor R and the light emitted from the element L reaches the light sensitive element H. Then the light sensitive element H becomes conductive to energize the relay Q and close the electric circuit such as the electrode styluses 4, 4'. Formation of the electric circuit the voltage necessary to effect the recording is applied between the recording paper 1 and the electrode styluses 4, 4' to cause electrodischarge therebetween.

Conversely, in the case where the recording paper 1 is completely consumed or the recording paper 1 is not inserted between the disc 3 and the paper guide 2 owing to troubles in the recording paper feeding mechanism, the return electrode 28 does not contact the conductive layer 1' of the recording paper 1. It follows that the light emitting element L is de-energized to provide no paper detection signal. The relay Q remains off. At this time the recording process is not carried out.

The metal plate 27 is used not only to detect the presence and absence of the recording paper 1 but to detect that of the transmitter original when the facsimile is used as a transmitter.

In the meanwhile, the mode of operation wherein the revolution torque is afforded to the reel 5 and the electrode stylus 4 is automatically protruded and advanced, will be now described in detail.

Signals from a control unit (not shown) of the facsimile apparatus causes the driving motor 24 to rotate. The rotation is transmitted from the driving pulley 23 to the main shaft pulley 20 via the belt 22 to move the main shaft 12. Since the disc 3 also is affixed to the main shaft 12, the disc 3 also moves in unison with the main shaft 12. As noted earlier, the idle gear 10 and the reel 5 via the reel installation plate 6 are respectively fitted to the disc 3 by the shaft 11. When the braking torque is not exerted on the protrusion shaft 14, the reel 5 and the idle gear 10 revolve around the main shaft 12 keeping the engaging relationship therebetween as the disc 3 rotates. At this time the idle gear 10 engages with and rotates round the main gear shaft 15 round, resulting in that the protrusion shaft 14 is allowed to rotate at the same rate of the revolution of the disc 3. In other words, when the braking torque is not afforded the reel 5 so that the electrode stylus 4 accommodated therein does not receive the protrusion torque. The stylus pressure is not applied.

When the braking torque is not exerted on the protrusion shaft, the braking means 30 is not operative. For example, this occurs when both terminals of the shunt resistor 36 are open. Even when the braking motor 34 is energized from the outside by means of the revolution torque of the disc 3 which is transmitted from the idle gear 10 to the protrusion shaft 14, the voltage is induced between both terminals of the motor 34 in proportion of the revolution rate but no armature current flows. Therefore, the braking motor 34 is not capable of functioning as a DC generator and then no braking torque is afforded to the protrusion shaft 14.

The protrusion shaft 14 will receive the braking torque as follows. The shunt resistor 36 is so adjusted to a proper resistance value that a circuit is established for flowing the armature current generated by the braking motor 34. When the shunt resistor 36 is adjusted and the disc 3 revolves as well as the protrusion shaft 14, the braking motor shaft 35 also turns around serving as the DC generator. In this way the reaction moment occurs by magnetic field system and magnetic function of the armature current of the motor 34 so that the braking torque is exerted for damping the revolution of the protrusion shaft 14. The braking torque is transmitted to the reel through the idle gear 10 to provide the reel 5 with the revolution torque. The disc 3 rotates in the clockwise direction while the electrode stylus 4 is would many times in the clockwise direction within the reel 5 of which the termination end is fixed to the reel 5. As a result, the revolution torque is exerted on the reel 5 in the counterclockwise direction so that the electrode stylus 4 in the spiral mode is expanded outward to produce the protrusion torque which advances the electrode stylus 4 to the writing point.

The electrode stylus pressure may be adjusted by varying the resistance value of the shunt resistor 36 because the braking torque is produced in proportion to the shunt current when the braking motor 34 rotates at a fixed rate. Adjustment of the resistance value is accomplished by manual operation or remote control operation with electronic circuits.

The end of the electrode stylus 4 touches the pressure plate 41 during the recording procedure as the electrode stylus 4 reaches the electrode stylus admission arrangement 40 with the revolution of the disc 3. When the disc 3 further rotates, the pressure plate 41 serves to suppress the protrusion torque to deflect the electrode stylus 4 as shown by the dotted line of FIG. 3(*c*). The deflection of the electrode stylus 4 is caused even when the electrode stylus 4 slides along the surface of the pressure plate 41 and advances to the surface of the recording paper 1. The scanning of the recording paper surface is accomplished under the conditions that the electrode stylus 4 is deflected to keep balance between the protrusion torque and the reaction force.

As illustrated in FIG. 3(*b*), provision of the guide 54' and the groove 55 on the rear of the reel cover 53' is to provide the room absorbing the deflection of the electrode stylus thereby smoothing the protrusion and advancement of the electrode stylus 4.

In the case of stopping the recording operation of the facsimile apparatus, application of interruption signals stops the revolution of the disc 3 and no shunt current flows through the braking motor 34. For this reason the braking torque disappears and accordingly the protrusion torque is removed from the electrode stylus 4 to lower automatically the stylus pressure.

The above embodiment utilizes the DC motor to produce the electrode stylus protrusion torque, that is, the braking torque and thus the stylus pressure may be controlled with ease. In addition, the motor is so supplied with a DC potential that the reel is rotated in the reverse direction to rewind the electrode stylus within the reel. In stead of the above the DC motor, the braking means providing the braking torque may comprises a friction brake providing the protrusion shaft 14 with mechanical braking force or other braking arrangement containing a disc disposed in a magnetic field of which revolution causes eddy current to produce the braking torque.

We claim:

1. A recorder comprising:

a record member on which a desired pattern is to be reproduced;

a recording electrode stylus means wound in a spiral configuration with a tendency to enlarge and unwind said configuration in response to a revolution torque;

a rotatably mounted disc means;

means for rotating said disc means at a given velocity during a recording operation;

reel means for accommodation of said spirally wound electrode stylus, said reel means being rotatably secured on an axis on said disc means; and stylus protrusion means coupled to said reel means for imparting to the stylus means, a revolution torque of a selected value which tends to enlarge and unwind said spiral configuration and cause a tip portion of said stylus to protrude from said reel means toward a recording position on said record member.

2. The recorder of claim 1 wherein there is further provided a stylus holder for supporting at a recording point on said record member said tip portion of said stylus.

3. The recorder of claim 1 wherein adjustment means are provided to selectively control the value of the revolution torque generated by said stylus protrusion means.

4. The recorder of claim 1 wherein said reel means includes a cover in which a guide means for said tip portion of said stylus is provided, said guide means being offset from the circumference of said spiral configuration toward the center thereof and cavity means having a width at least equal to the radius of said spiral configuration, said cavity communicating with said guide means.

5. The recorder of claim 1 wherein the record member comprises an electrosensitive paper having a conductive layer and there is further provided, electrode means for receiving signals to be recorded in cooperation with said electrode stylus during the recording operation, recording paper detection means contacting said conductive layer during the recording paper feeding process for establishing an electric circuit via the conductive layer together with said electrode means, said electric circuit upon being established generating a control signal, and switching circuit means for controlling the application of the signals to be recorded in response to said control signals from said electric circuit.

6. The recorder of claim 1 wherein said stylus means comprises an elastic and anti-abrasive material.

7. The recorder of claim 1 wherein said reel means is rotatably disposed on said disc means for rotation thereon at a velocity independent of the disc rotation velocity and said stylus protrusion means comprises:

braking means mechanically coupled with said reel means for braking only the revolution of said reel means to produce a variation in the relative velocities of said reel and disc means to thereby impart to the stylus means a revolution torque in a direction which causes said tip portion of said stylus to protrude from said reel toward a recording position on said record member.

8. The recorder of claim 7 wherein said braking means comprises an electric motor means for dynamically braking the rotation of said reel means.

9. The recorder of claim 8 wherein said electric motor is a direct current motor.

10. The recorder of claim 9 wherein the armature of said motor is provided with a variable shunt resistor means for controlling the value of said revolution torque.

11. A recorder comprising:

a record member on which a desired pattern is to be reproduced;

a recording electrode stylus made of elastic and anti-abrasive material and shaped in a spiral fashion as a whole with a tendency to enlarge the spiral configuration due to the unwinding force thereof;

a disc rotating at a given velocity at least during the recording operation;

a reel so movably secured on the disc that it may rotate at certain velocities irrespective of the revolution velocity of the disc, said reel having a cavity for accommodation of the spirally-shaped electrode stylus and an aperture formed in a direction of the tangent touching the stylus winding circumference therein, one end of the stylus being fastened within the reel;

braking means mechanically coupled with the reel for braking only the revolution of the reel thereby to provide to the electrode stylus a revolution torque causing the other end of the electrode stylus to be protruded through the aperture from the reel; and a stylus holder for supporting at a recording point on the record member the protruded end portion of the electrode stylus.

12. A recorder comprising:

an electrosensitive recording paper on which a desired pattern is to be reproduced;

at least one recording electrode stylus made of elastic and anti-abrasive material and shaped in a spiral fashion as a whole with a tendency to enlarge the spiral configuration due to the unwinding force thereof;

a rotary disc;

at least one reel having a cavity for accommodation of the spirally-shaped electrode stylus;

at least one reel installation plate secured on the disc in such a way that the reel may rotate on its axis;

a double shaft arrangement having first and second shafts;

a driving motor mechanically coupled with the rotary disc via the first shaft for rotating the rotary disc on its axis together with the reel and the reel installation plate secured on the rotary disc;

at least one idler gear positioned between the second shaft of the double shaft arrangement and the reel;

a braking motor mechanically coupled with the reel via the second shaft and the idler for braking only the revolution of the second shaft thereby to provide to the reel a revolution torque in a direction for causing the tip of the recording electrode stylus to be protruded from the reel; and at least one stylus holder for supporting at a recording point on the recording paper the tip portion of the recording stylus.

* * * * *

UNITED STATES PATENT OFFICE

CERTIFICATE OF CORRECTION

Patent No. 3,846,802 Dated November 5, 1974

Inventor(s) Hirosi Kyotani, Yoshitaka Murono and Katukiko Siojima

It is certified that error appears in the above-identified patent and that said Letters Patent are hereby corrected as shown below:

In The Claims:

Col. 8, line 36, delete "enlarge and"

Col. 9, lines 44 to 45, change "to enlarge the spiral configuration due to the unwinding force thereof" to--to unwind the spiral configuration due to a revolution torque applied thereto--

Col. 10, lines 21 to 23, change "to enlarge the spiral configuration due to the unwinding force thereof" to--to unwind the spiral configuration due to a revolution torque applied thereto--

Signed and sealed this 1st day of July 1975.

(SEAL)
Attest:

RUTH C. MASON
Attesting Officer

C. MARSHALL DANN
Commissioner of Patents
and Trademarks